Sept. 20, 1932.  E. J. FISCHER  1,878,450

HYDRAULIC SPRING DEVICE FOR AUTOMOBILES

Filed Aug. 6, 1928  2 Sheets-Sheet 1

INVENTOR

ATTORNEY.

Sept. 20, 1932.    E. J. FISCHER    1,878,450
HYDRAULIC SPRING DEVICE FOR AUTOMOBILES
Filed Aug. 6, 1928    2 Sheets-Sheet 2
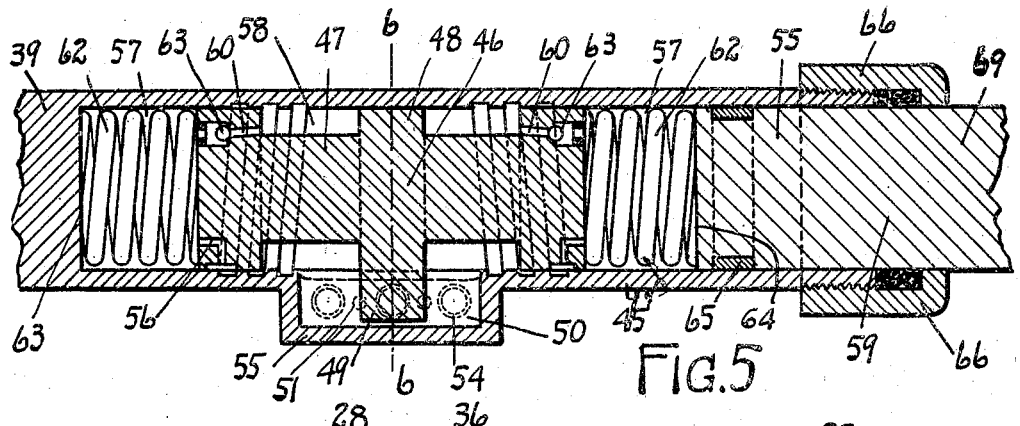
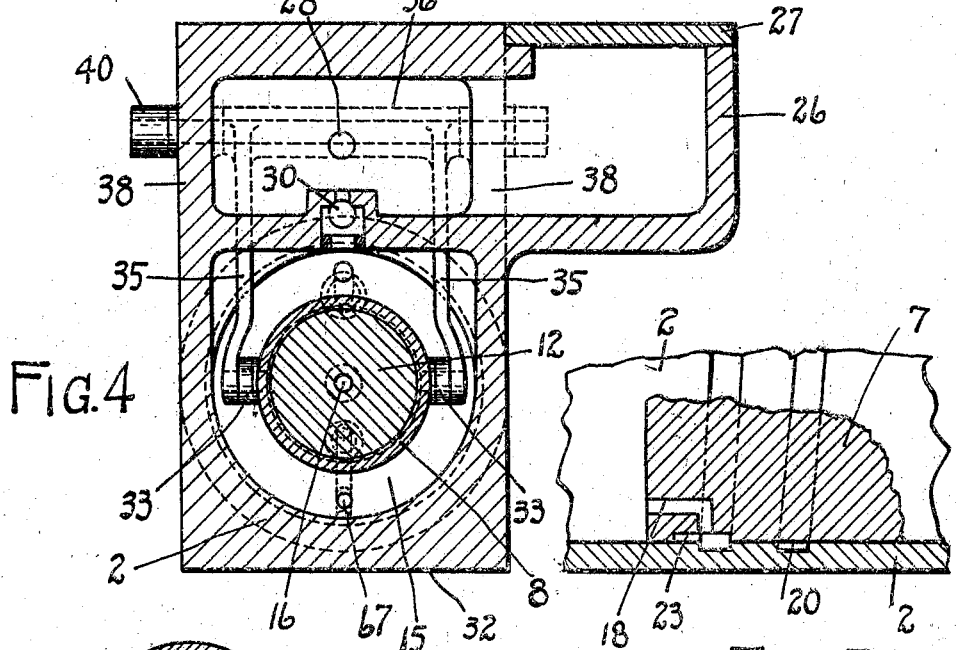
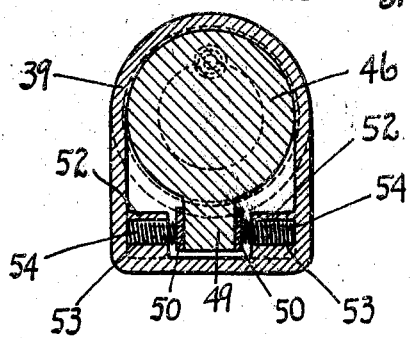
INVENTOR
Edward J. Fischer
by John W. Street
ATTORNEY.

Patented Sept. 20, 1932

1,878,450

UNITED STATES PATENT OFFICE

EDWARD J. FISCHER, OF COVINGTON, KENTUCKY, ASSIGNOR OF ONE-HALF TO FRANK A. AMAN

HYDRAULIC SPRING DEVICE FOR AUTOMOBILES

Application filed August 6, 1928. Serial No. 297,601.

I have invented a new hydraulic shock absorbing device for automobiles and motor driven vehicles which is compound in its action, simple in construction and eliminates the usual exposed flat springs which are subject to breakage, the device combining a very efficient shock absorbing element and furnishing a smooth, comfortable riding quality. It operates equally well in winter and summer, as the liquid used is non-freezing. The device is so designed that it can be attached to the chassis as shown, or to the frame of the automobile as some of cars have.

In the accompanying drawings forming part of this specification:—

Fig. 4 is a section taken on line 4, 4 of Fig. 3.

Fig. 5 is a vertical longitudinal section of one of the arms to show construction, Fig. 6 is a section taken on line 6, 6 of the parts shown in Fig. 5, and Fig. 7 is an enlarged detail of the one of the bypasses leading into the rifled cylinder.

Figure 1:
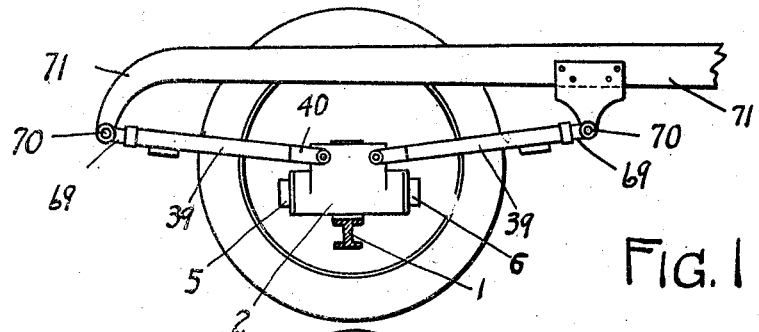
Fig. 1 is a side view of the device shown in position at the forward end of an automobile.
Figure 2:
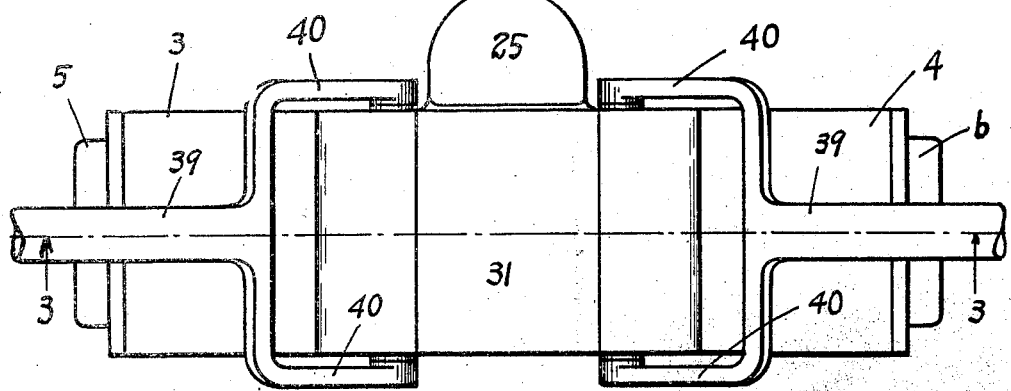
Fig. 2 is a plan view of the device only with the arms broken away.
Figure 3:
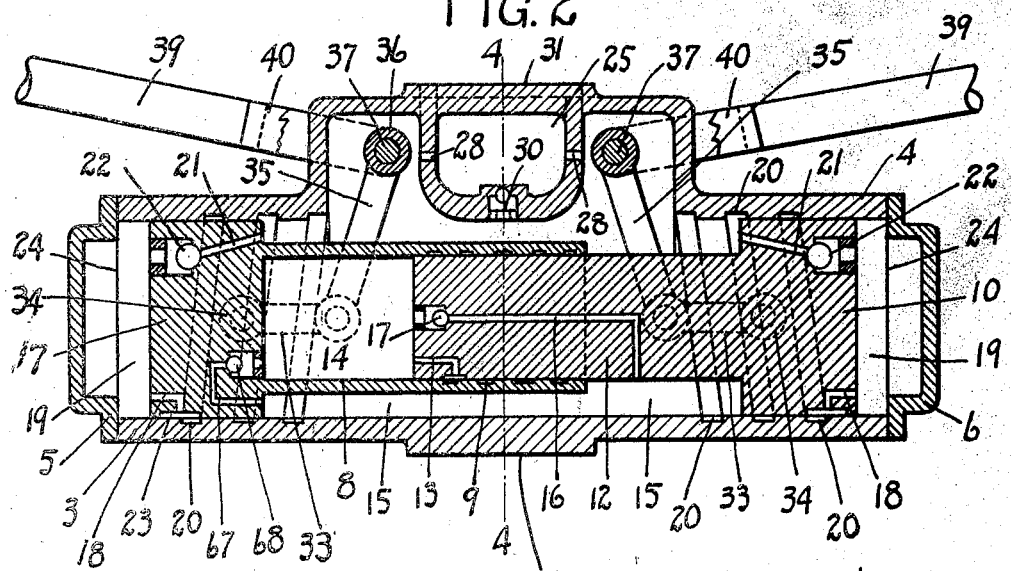
Fig. 3 is a section taken on line 3, 3 of Fig. 2.

I will first describe that part of the device which is shown fastened to the axle 1 of the automobile.

I have a main cylinder 2, having ends 3 and 4 provided with internal spiral grooves 20. Secured to these ends I have the heads 5 and 6. In the ends 3, I provide a plunger 7 which is integral with a sleeve 8. This sleeve is provided with internal spiral grooves 9. In the end 4, I provide a plunger 10 which has fitting in the sleeve 8 the reduced extension 12 in which I place a bypass 13. This bypass 13 opens into the spiral grooves 9 to allow the liquid to pass from the reservoir 14 formed in the sleeve 8 into said grooves 9 when the plungers 7 and 10 are compressed together. The liquid then escapes into a reservoir 15 formed in the main cylinder 2 around the sleeve 8 and extension 12. When the plungers 7 and 10 return to the normal position, the liquid returns back to the reservoir 14 through the port 16 and the check valve 17 in the extension 12.

I also provide bypasses 18 in each of the plungers 7 and 10, to allow the liquid to pass from the reservoirs 19 through the spiral grooves 20 into the reservoirs 15; and the ports 21 and the check valves 22 in the plungers 7 and 10 allow the liquid to return to the reservoirs 19, when the plungers 7 and 10 return to normal. I also provide bypass 67 and check valve 68 in the plunger 7 to allow the liquid to return to the reservoir 14 from the reservoir 15 as the plungers return to normal.

The bypasses 13 and 18 are of similar design, said bypasses being provided with elongated slots 23 to furnish an outlet into the spiral grooves 20 as well as to close off the return of the liquid when the plungers 7 and 10 have reached the outer ends 24 of the cylinder 3. At the top of the cylinder 2, I provide an oil chamber 25, which has an extension 26 for filling purposes. This extension is provided with a cover 27 which is airtight. This oil chamber 25 is to make the device more efficient, said chamber having lateral openings 28 to allow the liquid to pass into the main reservoir 15 when the device is filled; and the check valve 30 is to allow the liquid to circulate through the reservoir 15 and chamber 25 when the plungers 7 and 10 operate.

The top of the oil chamber 25 is provided with a flat surface 31 and the bottom of the cylinder 2 is also provided similarly with a flat surface 32 so that the device can be fastened to the automobile at either top or bottom. The plungers 7 and 10 have the side links 33 pivotally connected thereto at their ends 34, and the opposite ends of the links 33 are pivotally connected to the bifurcated ends 35 of the levers 36. The levers 36 are fixed on the shafts 37 which extend through and turn in the walls 38 of an upward extension of the cylinder 2. The arms 39 have the bifurcated ends 40 which straddle the cylinder 2 and are fixed to the respective end parts of the shaft 37.

Each arm 39 comprises a rod member 59 and a casing 45 receiving the rod member 59 and enclosing a plunger 46, the closed end of the casing being, as here shown, the part of the arm that is fixed to the respective shaft 37 as above described. The plunger 46 has necks 47 and a central portion 48 which has a downwardly extending lug 49 in a lower extension of the casing 45, this extension having thickened sides 52. Engaging in either side of this lug, I have the plates 50, having pins 51 movably fitting in the sides 52, which sides have recesses 53 containing springs 54 to bear against the plates 50 and allow a cushion effect in limiting lateral movement or rotation of the plunger 46. The interior of the casing 45 has spiral grooves 55 and the plunger 46 has bypasses 56 to allow the liquid to pass through the grooves 55 from the reservoirs 57 at the ends of the plunger 46 into the reservoir 58 around the middle of the plunger 46 when this plunger 46 moves either way from mid position.

The bypasses 60 and check valves 61 are to allow the liquid to return to the reservoirs 57 when the plunger 46 returns to normal midposition.

I provide springs 62 which are located in the casing 45 and bear against the ends of plunger 46 at their inner ends and the outer ends of the springs 62 bear, respectively, against the inner end 63 of the casing and the rod end 59. In order to prevent any leakage I provide a packing ring 65 near the end of the rod member 59 and packing nuts 66 are furnished to help make the device more leak-proof. Each rod member 59 has its outer end 70 pivoted to the chassis 71 in the places where the spring shackles usually are connected.

As the axle 1 rises relatively to the chassis 71, the casing members 45 of the arms 39 slide up on the rod members 59 thereof, and the plungers 7 and 10 in the cylinder 2 are pushed together, owing to the assembled parts assuming a more nearly straight line arrangement. These movements are resisted by the flow of the liquid through the spiral grooves 9 and 20 in the cylinder 2 and grooves 55 in the casing members 45, respectively, and the springs 62 in the casing members also yieldingly resist these movements. Consequently there is a cushioning effect on the upbound of the wheel and axle similar to that afforded by the conventional vehicle spring. Upon return of the axle and wheel downwardly the casings 45 slide down on the rod members 59 and the springs 62 expand and the liquid flows back through the bypasses 60, and the resistance to flow of the liquid through the bypasses affords a cushioning effect and transmits part of the motion to the plungers 7 and 10 in the cylinder 2, pushing the plungers apart, with the liquid flowing back through the bypasses 21 and 67, which resist the flow of the liquid and afford a further cushioning effect.

I do not wish to confine myself to the specific construction herein set forth, and it is obvious that I may change the construction to some extent and I claim all such changes and modifications which fall within the scope of this specification and claims.

What I claim as new and my invention and desire to secure by Letters Patent is:—

1. In combination with relatively movable running gear elements of a vehicle, a cylinder attached to one element, cushioned plungers in the cylinder, one plunger having a sleeve and the other plunger having a cushioned extension slidable in said sleeve, and arms fulcrumed on the cylinder, operatively connected to the respective plungers, extending in opposite directions from the cylinder, and having their extended ends operatively connected to the other running gear element.

2. In combination with relatively movable running gear elements of a vehicle, a cylinder attached to one element, having spiral grooves in its interior walls, plungers in the cylinder, and arms fulcrumed on the cylinder, operatively connected to the respective plungers, extending in opposite directions from the cylinder, and having their extended ends operatively connected to the other running gear element, said plungers having bypasses making and breaking connection with the respective grooves during movement of the plungers, and having return passages, and check valves in the respective return passages.

3. In combination with relatively movable running gear elements of a vehicle, a cylinder attached to one element, having spiral grooves in its interior walls, plungers in the cylinder, one plunger having a sleeve and the other plunger having an extension slidable in said sleeve, and arms fulcrumed on the cylinder, operatively connected to the respective plungers, extending in opposite directions from the cylinder, and having their extended ends operatively connected to the other running gear element, said plungers and said extension having bypasses making and breaking connection with the respective grooves during movement of the plungers, and having return passages, and check valves in the respective return passages.

4. In combination with relatively movable running gear elements of a vehicle, a cylinder attached to one element, cushioned plungers in the cylinder, and arms fulcrumed on the cylinder, each comprising a member adjacent to the fulcrum and a member operatively connected to the other running gear element, said arms extending in opposite directions from said cylinder to their connections to said other running gear element, one member of each arm comprising a casing in which the other member slides, and means in the casing to cushion the sliding of the other member.

5. In combination with relatively movable running gear elements of a vehicle, a cylinder attached to one element, cushioned plungers in the cylinder, one plunger having a sleeve and the other plunger having a cushioned extension slidable in said sleeve, and arms fulcrumed on the cylinder, each comprising a member adjacent to the fulcrum and a member operatively connected to the other running gear element, said arms extending in opposite directions from said cylinder to their connections to said other running gear element, one member of each arm comprising a casing in which the other member slides, and means in the casing to cushion the sliding of the other member.

6. In combination with relatively movable running gear elements of a vehicle, a cylinder attached to one element, having spiral grooves in its interior walls, plungers in the cylinder, one plunger having a sleeve and the other plunger having an extension slidable in said sleeve, said plungers and said extension having bypasses making and breaking connection with the respective grooves during movement of the plungers, and having return passages, check valves in the respective return passages, and arms fulcrumed on the cylinder, each comprising a member adjacent to the fulcrum and a member operatively connected to the other running gear element, said arms extending in opposite directions from said cylinder to their connections to the other running gear element, one member of each arm comprising a casing in which the other member slides, and means in the casing to cushion the sliding of the other member.

7. In combination with relatively moving running gear elements of a vehicle, a cylinder attached to one element, having spiral grooves in its interior walls, plungers in the cylinder, said plungers having bypasses making and breaking connection with the respective grooves during movement of the plungers, and having return passages, check valves in the respective return passages, and arms fulcrumed on the cylinder, each comprising a member adjacent to the fulcrum and a member operatively connected to the other running gear element, said arms extending in opposite directions from said cylinder to their connections to the other running gear element, one member of each arm comprising a casing having spiral grooves in its interior walls, the other member of the arm sliding in said casing, plungers slidable in the casings of the respective arms, each having a bypass making and breaking connection with the respective casing wall grooves, each plunger having a bypass, and check valves in the respective bypasses.

8. In combination with relatively moving running gear elements of a vehicle, a cylinder attached to one element, having spiral grooves in its interior walls, plungers in the cylinder, one plunger having a sleeve with spiral grooves in its interior walls and the other plunger having an extension slidable in said sleeve, said plungers and said extension having bypasses making and breaking connection with the respective grooves during movement of the plungers, and having return passages, check valves in the respective return passages, and arms fulcrumed on the cylinder, each comprising a member adjacent to the fulcrum and a member operatively connected to the other running gear element, said arms extending in opposite directions from said cylinder to their connections to the other running gear element, one member of each arm comprising a casing having spiral grooves in its interior walls, the other member of the arm sliding in said casing, plungers slidable in the casings of the respective arms, each having a bypass making and breaking connection with the respective casing wall grooves, each plunger having a bypass, and check valves in the respective bypasses.

9. In combination with relatively moving running gear elements of a vehicle, a cylinder attached to one element, having spiral grooves in its interior walls, plungers in the cylinder, one plunger having a sleeve with spiral grooves in its interior walls, and the other plunger having an extension slidable in said sleeve, said plungers and said extension having bypasses making and breaking connection with the respective grooves during movement of the plungers, said plungers having return passages, check valves in the respective return passages, and means operatively connecting said plungers to the outer running gear element.

10. In combination with relatively movable running gear elements of a vehicle, a cylinder attached to one element, arms operatively connecting one running gear element to the other running gear element, said arms extending in opposite directions from their connections to the one running gear element to their connections to the other running gear element, one member of each arm comprising a casing having spiral grooves in its interior walls, the other member of the arm sliding in said casing, plungers slidable in the casings of the respective arms, each having a bypass making and breaking connection with the respective casing wall grooves, and each plunger having a bypass, and check valves in the respective bypasses.

11. In combination with relatively movable running gear elements of a vehicle, a connecting member comprising a casing with a closed end connected to one running gear element, having spiral grooves in its interior walls, a plunger in the casing having bypasses making and breaking connection with the respective grooves during movement of the plunger, said plunger having return passages, check valves in the respective return passages, a rod sliding in said casing and operatively connecting said casing to the other running gear element, a spring between said rod and said plunger, and a spring between said plunger and said closed end of said casing.

In testimony whereof, I affix my signature at the city of Cincinnati, county of Hamilton and State of Ohio, this 4th day of August, 1928.

EDWARD J. FISCHER.